United States Patent
Hoetzer

(10) Patent No.: US 8,165,796 B2
(45) Date of Patent: Apr. 24, 2012

(54) COLLISION AVOIDANCE SYSTEM AND METHOD

(75) Inventor: Dieter Hoetzer, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 888 days.

(21) Appl. No.: 12/205,086

(22) Filed: Sep. 5, 2008

(65) Prior Publication Data

US 2010/0063736 A1    Mar. 11, 2010

(51) Int. Cl.
*G08G 1/16* (2006.01)
(52) U.S. Cl. ....................................................... 701/301
(58) Field of Classification Search .................. 701/301
See application file for complete search history.

(56) References Cited

U.S. PATENT DOCUMENTS

| | | | |
|---|---|---|---|
| 5,351,055 A | 9/1994 | Fujikawa et al. | |
| 6,804,607 B1 | 10/2004 | Wood | |
| 6,856,919 B1* | 2/2005 | Bastian et al. | 702/40 |
| 6,903,677 B2* | 6/2005 | Takashima et al. | 342/70 |
| 7,197,396 B2 | 3/2007 | Stopczynski | |
| 7,864,096 B2* | 1/2011 | Stayton et al. | 342/29 |
| 2002/0021229 A1* | 2/2002 | Stein | 340/933 |
| 2006/0173621 A1* | 8/2006 | Stopczynski | 701/301 |
| 2007/0016372 A1 | 1/2007 | Browne et al. | |
| 2007/0070069 A1 | 3/2007 | Samarasekera et al. | |
| 2009/0184862 A1* | 7/2009 | Stayton et al. | 342/30 |

OTHER PUBLICATIONS

Wikipedia, "Autonomous Cruise Control System", 2 pages, Available Online at: <http://en.wikipedia.org/wiki/Adaptive_cruise_control>, Printed Jan. 10, 2008.
Wikipedia, "Emergency Warning System for Vehicles", 5 pages, Available Online at: <http://en.wikipedia.org/wiki/Emergency_warning_system_for_vehicles>, Printed Jan. 10, 2008.
Wikipedia, "Forward Collision Warning", 1 page, Available Online at: <http://en.wikipedia.org/wiki/Forward_collision_warning>, Printed Jan. 10, 2008.
Wikipedia, "Lane Departure Warning System", 2 pages, Available Online at: <http://en.wikipedia.org/wiki/Lateral_Support>, Printed Jan. 10, 2008.
Wikipedia, "Precrash System", 2 pages, Available Online at: <http://en.wikipedia.org/wiki/Precrash_system>, Printed Jan. 10, 2008.
Wikipedia, "Telematics", 6 pages, Available Online at: <http://en.wikipedia.org/wiki/Telematics>, Printed Jan. 11, 2008.

* cited by examiner

*Primary Examiner* — Amee A Shah
(74) *Attorney, Agent, or Firm* — Michael Best & Friedrich LLP

(57) ABSTRACT

Systems and methods for avoiding a collision. A first sensor is located, for example, in a front portion of a vehicle and is configured to monitor a first area. A second sensor is located, for example, in a top portion of the vehicle and is configured to execute a 360-degree sweep of the area surrounding the vehicle. In a first position, the second sensor is retracted below an outer surface of the vehicle. In a second position, the second sensor is protracted above the outer surface of the vehicle. A controller is configured to detect a critical situation using the first sensor, detect zero or more additional critical situations using the second sensor, and initiate an evasive driving maneuver to avoid each of the critical situations.

24 Claims, 5 Drawing Sheets

COLLISION AVOIDANCE SYSTEM AND METHOD

BACKGROUND

The present invention relates to collision avoidance systems designed for use in automobiles.

Many new vehicles include collision avoidance technologies that are based-upon or incorporate RADAR (radio detecting and ranging), LIDAR (light detection and ranging), ultra-sonic sensors, or video systems. These collision avoidance systems are sometimes referred to as "adaptive cruise control" ("ACC") or "forward collision warning and mitigation" ("FCWM"). Although the technologies are improvements over past systems, they are still not capable of providing fully-automatic steering and braking.

In many instances, the sensors used in ACC and FCWM systems are incorporated in the front of the vehicle (e.g., in the grill area). Theoretically, the maximum field of view in such a configuration is 180 degrees (which includes all the objects in front of the vehicle). However, in practice, the field of view of most systems is 90 degrees, and achieving this field of view requires multiple sensors such as one, long-range radar sensor and two, short-range radar sensors. LIDAR sensors can be used to achieve a 360 degree field of view, but are difficult to integrate in a production vehicle in a customer-friendly manner.

SUMMARY

The performance of at least some collision avoidance systems could be improved if a field of view greater than 90 degrees could be achieved. While some LIDAR or RADAR sensors can be used to achieve a 360 degree field of view, they have been difficult to integrate in a production vehicle, as noted.

According to conventional wisdom, apart from using a LIDAR sensor, achieving a 360 degree field of view requires the use of many sensors located at different locations of the vehicle and fusion of the sensor output. Also, proper operation of such sensors can be affected by dirt, road grime, or inclement weather. Other challenges related to multiple-sensor, collision avoidance systems include incorporating the sensors into the vehicle in an aesthetically pleasing manner without adversely affecting the operation of the sensors and the cost of using multiple sensors, particularly multiple RADAR sensors.

In one embodiment, the invention provides a collision avoidance system that includes a forward-looking sensor (such as a long-range RADAR sensor) and a scanning sensor (such as a 360-degree LIDAR sensor). The long-range RADAR or first sensor is configured to monitor a first area, and the LIDAR sensor or second sensor is configured to radially sweep or monitor a second area. The second sensor is further configured to move from a first or retracted position to a second or protracted position. A controller is configured to be coupled to each of the first and second sensors. The controller is also configured to determine a primary critical situation using information from the first sensor, protract the second sensor from the first position to the second position, instruct the second sensor to execute a radial scan of the area surrounding the vehicle, identify zero or more secondary critical situations, and generate a control signal to initiate an evasive driving maneuver.

In another embodiment, the invention provides a method for collision avoidance. The method includes coupling a controller to a first sensor and a second sensor. A first area is monitored with the first sensor and a primary critical situation is identified using information from the first sensor. Next, the method includes protracting (or extending) the second sensor from a first position to a second position and scanning a second area. After scanning the second area, zero or more secondary critical situations are identified. The method then includes initiating an evasive driving maneuver to avoid the primary and secondary critical situations.

In yet another embodiment, the invention provides a critical situation avoidance system that includes a first vehicle subsystem configured to generate a first signal related to a condition of a vehicle and a sensor configured to radially scan an area. The sensor is configured to be movable from a first position to a second position with respect to the vehicle. A controller is configured to be coupled to the first vehicle subsystem and the sensor and is configured to identify a primary critical situation, identify zero or more secondary critical situations, and generate a signal to initiate an avoidance maneuver.

Embodiments of the invention also provide an improved scanning sensor, such as a LIDAR sensor. The sensor is integral to a vehicle and is protracted above an outer surface of the vehicle when a critical situation is detected. In other situations, the sensor is positioned below the outer surface of the vehicle to protect the sensor from dirt and debris. The sensor is also positioned beneath the outer surface of the vehicle to reduce drag and exposure to elements such as snow, rain, and the like.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
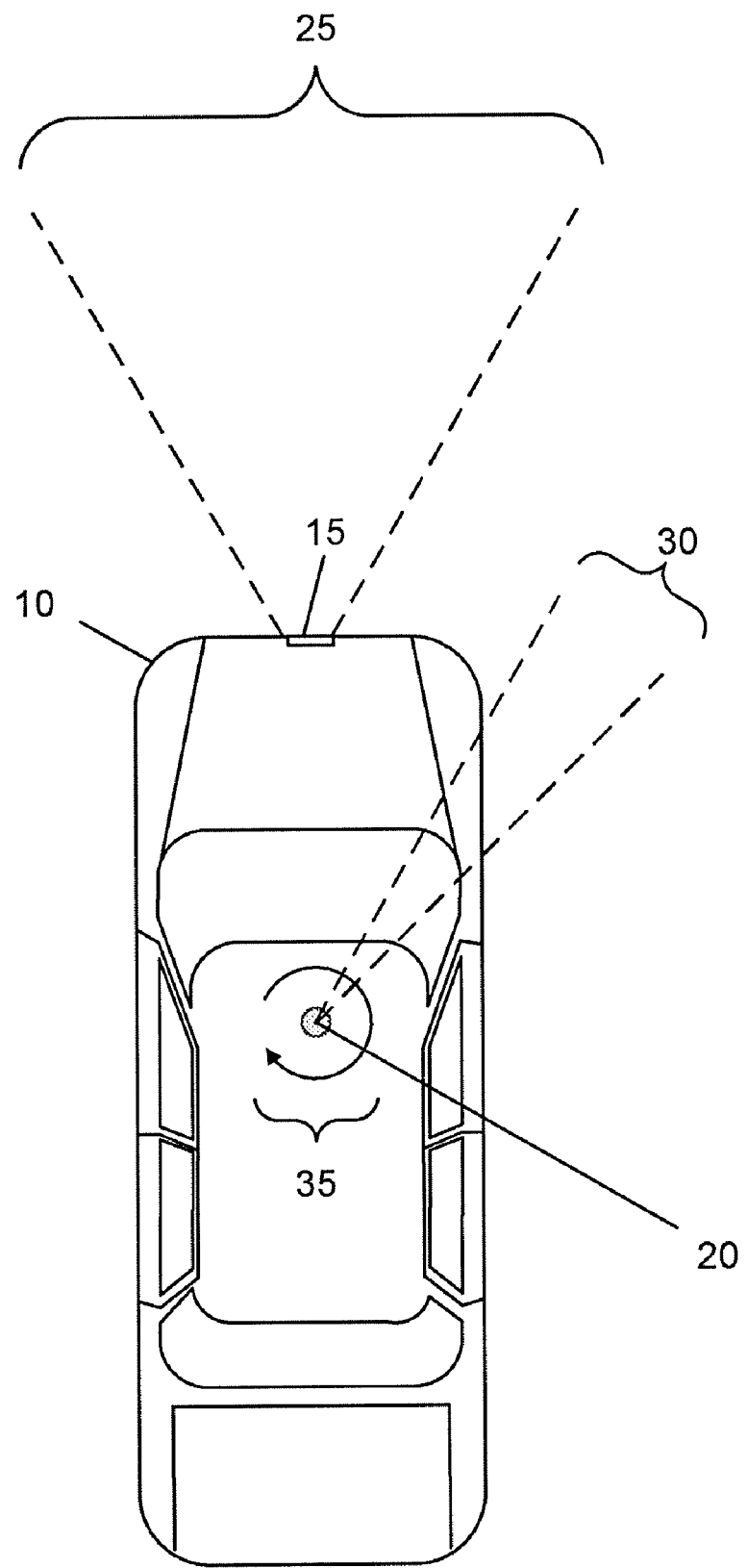
FIG. 1 illustrates a multi-sensor collision avoidance system.

FIG. 1 illustrates a vehicle 10 that includes two sensors. The sensors are, for example, RADAR sensors, LIDAR sensors, ultra-sonic sensors, or others. The first sensor 15 is capable of monitoring a first area 25 (which may be located in front of the vehicle or behind the vehicle). The second sensor 20 is located at the top of the vehicle 10 and is capable of monitoring a second area 30. Additionally, the second sensor 20 can rotate through a radial sweep angle 35, such as a 360-degree angle, that allows the second sensor 20 to radially sweep or scan an area surrounding the vehicle 10 (i.e., the area in front, to the side, and behind the vehicle). In some embodiments, the first sensor 15 is coupled to a different location or portion of the vehicle 10, such as a rear portion of the vehicle 10, a side portion of the vehicle 10, or to a top portion of the vehicle 10. In other embodiments, the second sensor 20 is also coupled to or integrated in a different portion of the vehicle 10, such as, for example, a bottom portion of the vehicle 10, a different location on the top of the vehicle 10, or an antenna of the vehicle 10.

The second sensor is movable with respect to the vehicle 10 in multiple directions. For example, in some embodiments, the second sensor is movable along and rotatable about a vertical axis with respect to the vehicle 10 to enable movement through the radial sweep angle. A radial sweep can include one or more radial sweep angles. The radial sweep angles are set by either a manufacturer or a user and can be defined in different ways. In some embodiments, for example, the radial sweep includes at least one 360-degree angle, four 90-degree angles, or two 180-degree angles. In embodiments of the invention that include more than one radial sweep angle, the radial sweep can include time delays between each of the radial sweep angles such that each radial sweep angle is distinct. The radial sweep angles are also, in some embodiments, adjacent and arcuate with respect to the vehicle 10.

In other embodiments, the radial sweep angle (or the sum of the radial sweep angles) does not equal 360-degrees. In one example, the second sensor is moved through two 120-degree radial sweep angles, a first sweep angle on a first side of the vehicle 10 and a second sweep angle on a second side of the vehicle 10 without the radial sweep angles being adjacent to one another with respect to the vehicle 10. In another embodiment, the second sensor is swept in a pivoting motion. The second sensor is swept through a first sweep angle and then returns to its original position through the first sweep angle. The second sensor can also be configured to execute one or more sweeps through defined sweep angles (as described above) and then, after a secondary critical situation (as described in greater detail below) has been identified, pivot to monitor the secondary critical situation until the situation has been avoided.

Figure 2:
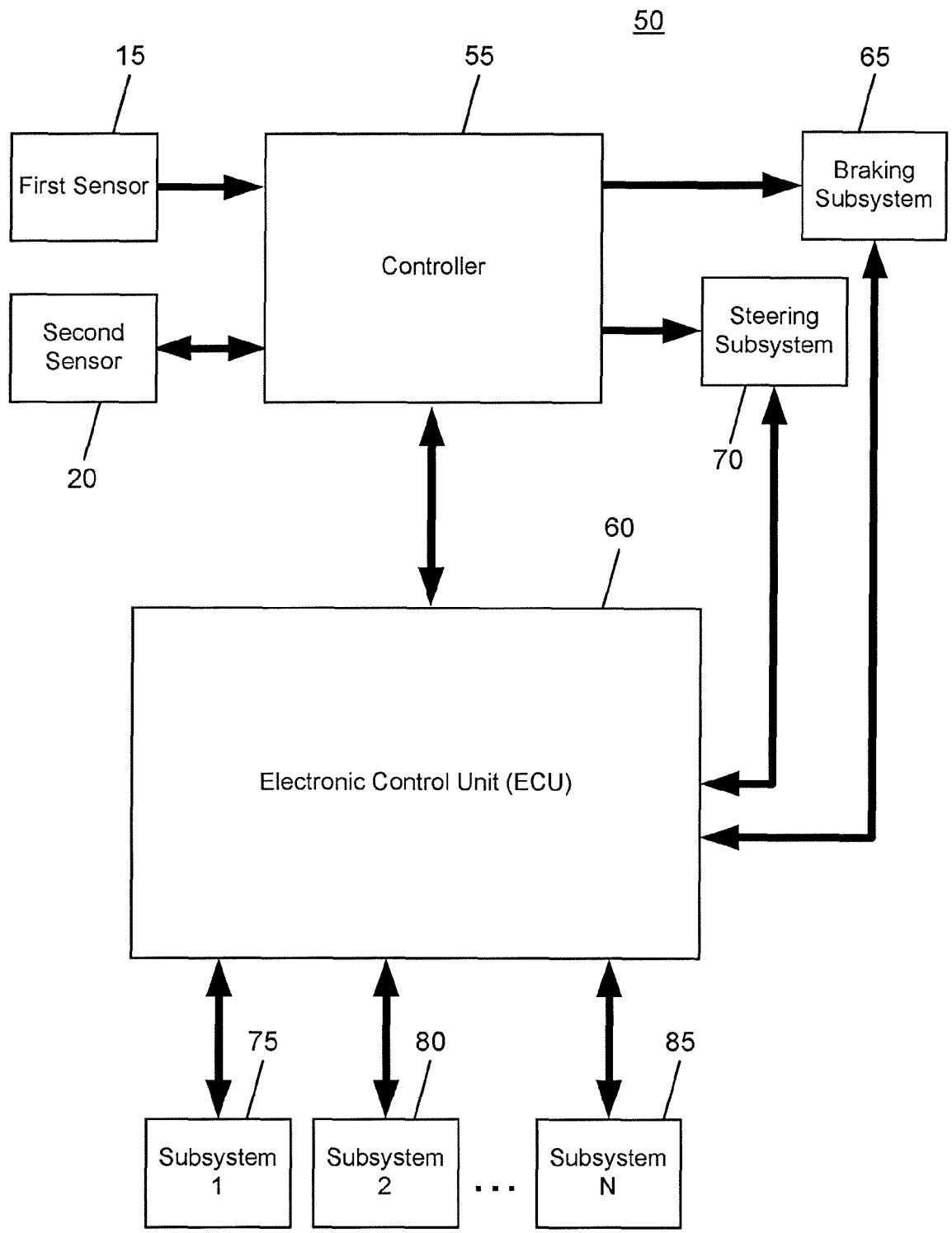
FIG. 2 illustrates a collision avoidance control system according to an embodiment of the invention.

FIG. 2 illustrates an embodiment of a collision avoidance control system 50. The control system 50 is configured to detect a critical situation, to determine an autonomous maneuver (e.g., braking, steering, accelerating, etc.) to avoid the critical situation, and to generate one or more control signals for vehicle components to execute the maneuver to avoid the critical situation. The control system 50 includes the first sensor 15, the second sensor 20, a controller 55, an electronic control unit (ECU) 60, and a plurality of subsystems 65-85. The controller 55 is a suitable electronic device, such as, for example, a microcontroller. The controller 55 may include both hardware and software components, and is meant to broadly encompass a combination of such components. The subsystems coupled to the ECU 60 include, among other things, a braking subsystem 65, a steering subsystem 70, a traction control subsystem, a stability control subsystem, and the like.

The first sensor 15 and the second sensor 20 are coupled to the controller 55. The controller 55 is configured to receive information from a variety of sources to determine whether a critical situation exists, and if a critical situation exists, determine actions to take to avoid the critical situation. Additionally, the controller 55 can determine (using the first sensor 15 and the second sensor 20) attributes such as the width or height of an object and use the attributes to evaluate the existence or severity of the critical situation. In addition to the first sensor 15 and the second sensor 20, the controller 55 also receives information from ECU 60. The ECU 60 is embedded in the vehicle 10 and is described as a single unit coupled to the plurality of vehicle subsystems 65-85. In other embodiments, each electronic subsystem in a vehicle has a corresponding ECU. The ECU 60 receives information from each of the vehicle subsystems 65-85, as well as outputs signals to control at least one of the vehicle subsystems 65-85.

The vehicle subsystems 65-85 provide information to the ECU 60 and subsequently the controller 55, which is necessary to determine if a critical situation exists and to take evasive actions to avoid the critical situation. Whether a critical situation exists is determined by the controller 55. The controller 55 determines whether a critical situation exists based on a predetermined set of criteria as well as information from the first sensor 15, the second sensor 20, and the plurality of vehicle subsystems 65-85 (as described below). Examples of critical situations include 1) lack of a predetermined (sometimes referred to as "safe") distance between the vehicle and other objects or vehicles and 2) imminent execution of a left turn. Other circumstances could be classified as critical situations such as passing a predetermined high-speed threshold, rainfall that exceeds a predetermined rate (as determined, for example, based upon information from a rain sensor, windshield wiper activity, or both), snowfall (or the fall of other frozen precipitation) that exceeds a predetermined rate or amount (as determined, for example, based upon information from a thermometer, windshield wiper activity, information from a precipitation sensor, or a combination thereof), execution of turns which cause a lateral acceleration sensor to output a sensed acceleration value that exceeds a predetermined threshold, execution of a parking maneuver, any time the vehicle 10 is traveling in reverse, and any time an electronic stability control (ESC) system is active.

In embodiments where a safe driving distance is considered a criteria for determining the existence of a critical situation, the controller 55 automatically calculates and continuously updates a safe driving distance parameter based on the speed of the vehicle 10, an estimated stopping distance (or stopping time) for the vehicle 10, and other driving conditions (e.g., road conditions, weather conditions, etc.).

If the first sensor 15 detects a second vehicle (or an object such as a deer or a pedestrian) in front of the vehicle 10 and beyond the safe driving distance, the controller 55 monitors the distance between the vehicle 10 and the second vehicle. As the distance between the vehicle 10 and the second vehicle approaches the safe driving distance, the controller 55 extends the second sensor 20 from a first position to a second position and radially scans the area surrounding the vehicle 10 to monitor the second vehicle. If the distance between the vehicle 10 and the second vehicle is or becomes less than the safe driving distance, the controller 55 determines that a critical situation exists and uses the information from first and second sensors to initiate an evasive driving maneuver (by generating commands or control signals to control braking, steering, and drivetrain components of the vehicle to, for example, slow the vehicle, change its direction, or cause it to accelerate).

In another embodiment, the controller 55 detects the second vehicle traveling in an adjacent lane and in the same direction as the vehicle 10. The second vehicle is beyond the safe driving distance and in a different lane. As the distance between the vehicle 10 and second vehicle approaches the safe driving distance, the controller 55 extends the second sensor 20. The first sensor 15 alone is not able to accurately monitor the position of the second vehicle because the second vehicle is not directly in front of the vehicle 10. Therefore, the controller 55 uses the first sensor 15 and the second sensor 20 to monitor the location of the second vehicle. The second vehicle then changes lanes (to the lane of the vehicle 10). If the distance from the vehicle 10 to the second vehicle is less than the safe driving distance, the controller 55 determines that a critical situation exists and initiates an evasive driving maneuver based on information received from the first and second sensors 15 and 20. In other embodiments, critical situations are defined differently. For example, a critical situation exists if the controller 55 determines that the vehicle 10 is approaching or has entered a potential accident location, such as an intersection or a parking lot. Such a determination is based on information from the first sensor 15, the second sensor 20, and vehicle subsystems 65-85, as described below.

In other embodiments, a critical situation is detected when the driver is executing a left hand turn (assuming right hand traffic flow). The controller 55 determines that the driver is executing a left hand turn based on the first sensor 15 and, for example, a steering-wheel-angle sensor or an activation of a left turn signal. The controller 55 then extends the second sensor 20 and executes a radial scan to monitor an intersection, oncoming traffic, and cross traffic. The controller 55 then causes (if necessary) an evasive driving maneuver to be executed to avoid a collision while turning. In other embodiments, additional criteria are used to identify a critical situation.

Critical situations are further identified as a primary critical situation or a secondary critical situation. For example, a primary critical situation is a critical situation that is detected in front of or behind the vehicle by the first sensor 15. Primary critical situations include the detection of, for example, a second vehicle, an object, a person, a potential accident location, etc. A secondary critical situation is a critical situation detected by the second sensor 20. Secondary critical situations include the detection of, for example, an adjacent vehicle, a vehicle traveling in a different lane of traffic, a tree, a pole, etc. which are not detectable by the first sensor. Additionally or alternatively, the second sensor 20 can be used to verify or monitor the primary critical situation detected by the first sensor 15.

The main subsystems used to execute an evasive driving action are the braking subsystem 65 and the steering subsystem 70. However, it is possible that the controller could also generate control signals to control the engine and, for example, cause the vehicle to accelerate. The additional subsystems 75-85 provide additional information and signals to the controller 55 related to conditions of the vehicle and conditions the vehicle is experiencing, such as road conditions, weather conditions, terrain, etc. The additional subsystems include, for example, the ESC system, an emergency brake, a navigation system, a side sensor, a rearview sensor, etc. The controller 55 analyzes each subsystem independently and/or in combination to determine if a critical situation exists and determines an action to respond to the critical situation. For example, the controller 55 considers road conditions when determining control signals to generate for the subsystems that execute an evasive driving maneuver. If the controller 55 determines that a low traction condition exists, a braking maneuver can result in a loss of traction, skidding, or a collision. In such an event, an evasive steering maneuver that does not require hard braking, is determined to be a safer maneuver. In other embodiments, factors from additional subsystems 75-85 affect the collision avoidance maneuvers generated by the controller 55.

Figure 3:
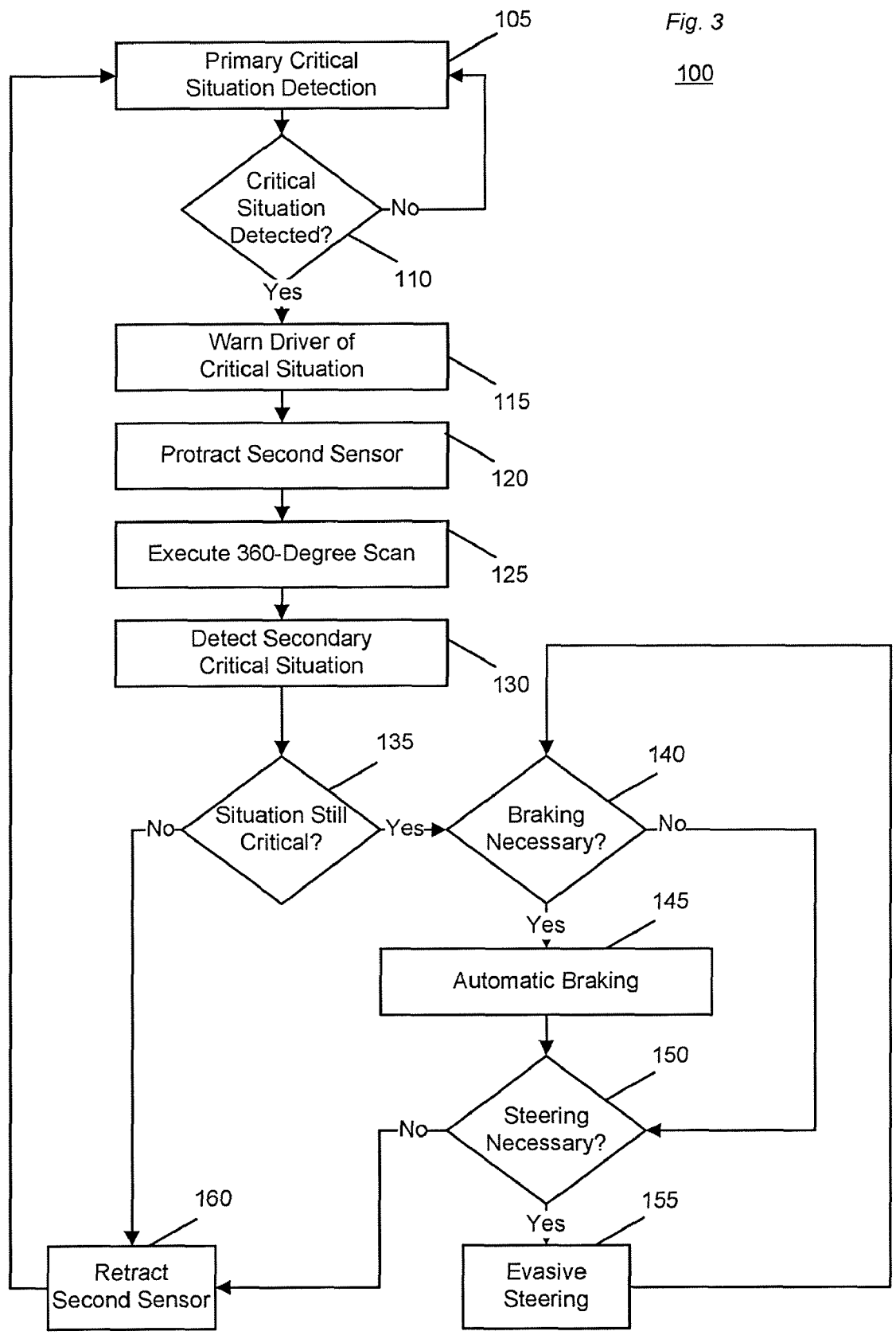
FIG. 3 illustrates a process for avoiding a collision according to an embodiment of the invention.

FIG. 3 illustrates an embodiment of a process 100 for collision avoidance. The process 100 begins with the first sensor 15 monitoring a first area for a primary critical situation (step 105). The first sensor 15 detects a primary critical situation such as a stationary object in front of the vehicle 10 or a rapidly decelerating object in front of the vehicle 10. For example, if an accident has occurred in front of the vehicle 10 and any of the one or more vehicles involved in the accident are stopped in the road in front of the vehicle 10, the first sensor 15 detects the presence of the vehicle. Additionally, when an accident occurs, drivers are, in many instances, required to apply their brakes rapidly to avoid the accident. In such an event, a chain reaction occurs in which a succession of vehicles apply their brakes and risk being involved in a rear-end collision, even if they are able to avoid the accident in front of them. As a result of the rapidity with which brakes are applied, as well as the limitations of human reaction time and evasive driving skills, a driver may not be able to avoid a collision.

If no primary critical situation is detected (step 110), the process 100 returns to step 105. If a primary critical situation is detected (step 110), the controller initiates a warning signal to the driver or operator to indicate the detection of the primary critical situation (step 115). The driver is warned by, for example, an audible warning, a visible warning, a tactile warning, or a combination thereof. The second sensor is then protracted (moved upward or extended) from the top of the vehicle 10 (step 120). After the second sensor 20 has been protracted, a 360-degree scan of the area surrounding the vehicle 10 is executed (step 125). The second sensor 20 detects the presence of zero or more secondary critical situations (step 130), such as, for example, a vehicle traveling in an adjacent lane of traffic, cross traffic (such as in an intersection), a pole, or a tree. A secondary critical situation is not necessarily detected in every scan. After executing the scan, the controller 55 determines whether the primary critical situation remains a critical situation (step 135). For example, in some instances, a second vehicle brakes rapidly, but is not near enough to the vehicle 10 or does not sustain the braking long enough to warrant an evasive action to be taken. If the controller 55 determines that the primary critical situation is no longer a critical situation, the second sensor 20 is retracted (step 160) and the process 100 returns to step 105. If the primary critical situation remains a critical situation, the controller 55 determines whether to apply automatic braking to avoid the primary critical situation (step 140).

If the controller 55 determines that no automatic braking is necessary, the controller determines whether to perform an evasive steering maneuver (step 150). If the controller 55 determines that automatic braking is necessary, it initiates an automatic braking maneuver to avoid the primary critical situation (step 145). Following step 145, the controller 55 determines whether to initiate an evasive steering maneuver (step 150). If the controller 55 determines that an evasive steering maneuver is not necessary, the second sensor 20 is retracted (step 160) and the process 100 returns to step 105. If the controller 55 determines that an evasive steering maneuver is necessary, the controller 55 initiates the evasive steering maneuver (step 155). The evasive steering maneuver executed depends on whether any secondary critical situations are detected. For example, if an evasive steering maneuver is required to avoid a critical situation, and the second sensor detected a secondary critical situation to the right of the vehicle 10 but no secondary critical situations to the left of the vehicle 10, the controller 55 initiates an evasive steering maneuver to the left. After initiating the evasive steering maneuver, the controller 55 again determines whether automatic braking is required and repeats steps 140 through 155 of the process 100 until no critical situations exist.

In other embodiments of the invention, the process 100 is implemented differently. For example, the second sensor is protracted in parallel with the driver being warned of the primary critical situation. Alternatively, the second sensor is protracted after the detection of a primary critical situation but before the driver is warned of the primary critical situation. The second sensor is then used to assess the primary critical situation before the system determines whether to provide a warning to the driver. The evasive steering and automatic braking are also, in some embodiments, implemented in parallel. For example, some critical situations require both an evasive steering maneuver and an automatic braking maneuver to be executed at approximately the same instant. The evasive steering maneuver and the automatic braking maneuver can also be implemented independently of each other. For example, the controller 55 determines if automatic braking is necessary after the detection of the primary critical situation, and a determination regarding an evasive steering maneuver is made only after the 360-degree scan has been executed. Additionally, the collision avoidance system is configurable to include factors such as time delays and additional radial scans.

The automatic braking and evasive steering maneuvers can also be implemented in a plurality of ways. For example, in one embodiment, the controller 55 is coupled directly to the braking subsystem 65 and the steering subsystem 70 and outputs commands to initiate maneuvers. The controller 55 provides information including a level of brake application, duration for the braking, and steering angle. In another embodiment, the controller 55 sends information to the ECU 60 which, in turn, initiates the maneuvers described above. In still further embodiments, other methods of initiating maneuvers are used.

In embodiments of the invention, the process 100 is executed in less than a second. The most significant delay in the process 100 is related to the speed at which the second sensor 20 is protracted and scans of the area surrounding the vehicle 10. In other embodiments, the process 100 is executed in less than the time required for a human to recognize and react to a driving situation. For example, human driving reaction time is usually estimated to be between 0.7 and 1.5 seconds for drivers that are alert and aware of their surroundings. As a result, collision avoidance maneuvers are taken in less than the human driving reaction time, and an accident that a driver would otherwise be unable to avoid are, in many instances, avoided.

Figure 4:
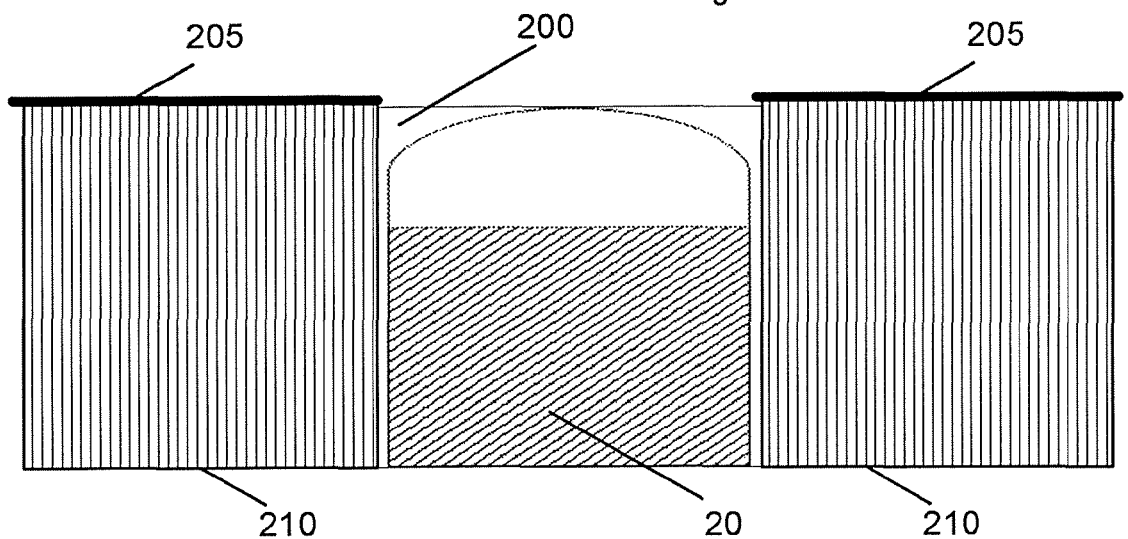
FIG. 4 illustrates a sensor in a retracted position.

FIG. 4 illustrates a cross-sectional view of the second sensor 20 in a retracted state. The second sensor 20 is usually retracted beneath the outer surface 205 of the vehicle 10. In the embodiment shown, the second sensor 20 is located at the top of the vehicle 10. However, in other embodiments, the second sensor 20 is positioned at other locations as described above. The second sensor 20 is housed in a recess 200. The recess 200 is a cutaway portion of the roof 210 of the vehicle 10. In some embodiments, the recess 200 includes a cover portion (not shown) that covers the second sensor 20 when it is retracted beneath the top 205 of the vehicle 10. The cover provides additional protection from dirt, debris, and other environmental elements.

Figure 5:
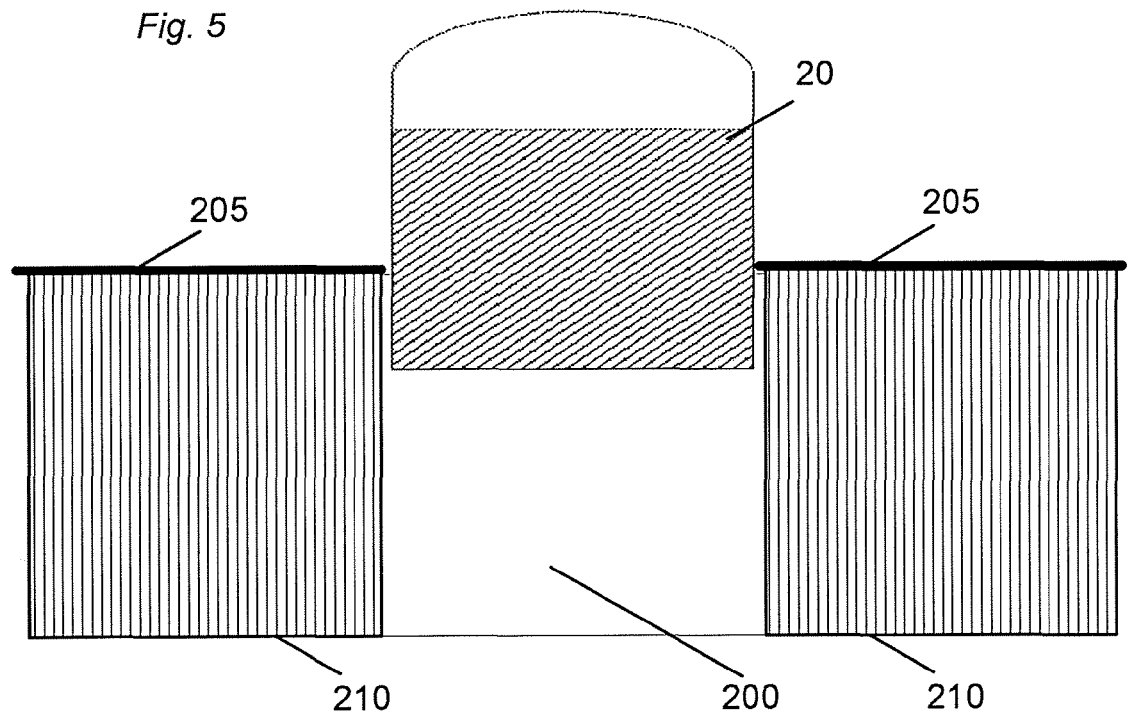
FIG. 5 illustrates a sensor in a protracted position.

FIG. 5 illustrates the second sensor 20 in a protracted state or position. The second sensor 20 is located above the outer surface 205 of the vehicle 10 and, in the protracted position, is ready to execute a 360-degree scan. As a result of being above the outer surface 205, the second sensor 20 has an unobstructed view of the area surrounding the vehicle 10. The second sensor 20 is protracted above the outer surface 205 by, for example, an electro-mechanical actuator (not shown) coupled to the second sensor 20. The second sensor 20 also includes rotary controls for rotating the second sensor 20 through a 360-degree angle. The electro-mechanical actuator and the rotary controls are coupled to, and receive control signals from, the controller 55. In other embodiments of the invention, different actuators and control methods are used.

Figure 6:
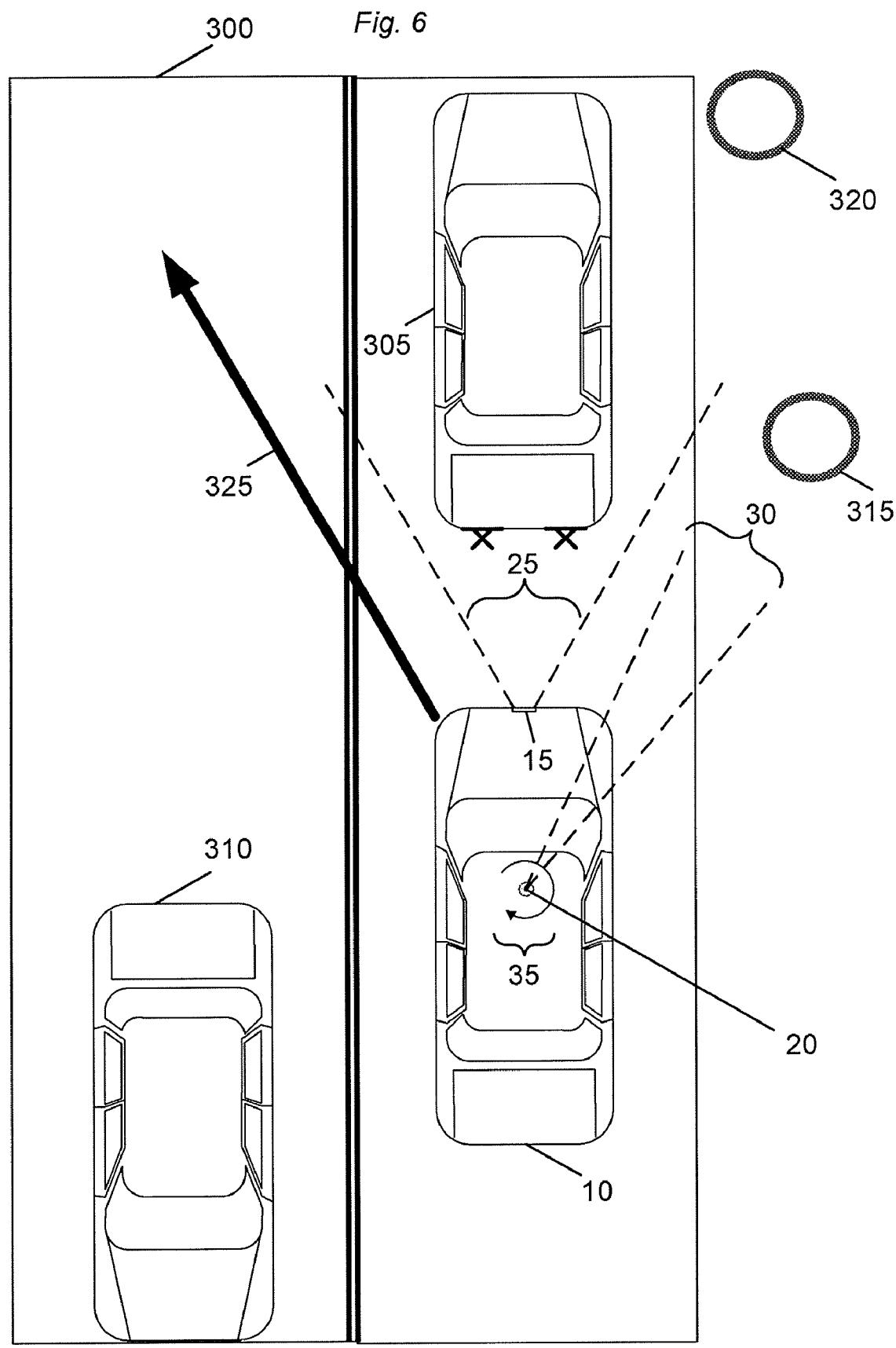
FIG. 6 illustrates a collision avoidance system and method according to an embodiment of the invention.

FIG. 6 illustrates an embodiment of the invention where the collision avoidance system detects and avoids multiple critical situations. FIG. 6 illustrates a road 300, a second vehicle 305, a third vehicle 310, a first pole 315, a second pole 320, and an evasive driving maneuver 325. The vehicle 10, as described above, includes the first sensor 15, the second sensor 20, and monitors areas 25 and 30. In one example, the vehicle 10 and the second vehicle 305 are initially traveling in the same direction at approximately the same speed. Then, the second vehicle 305 abruptly applies its brakes. The first sensor 15 detects the rapid change in speed of the second vehicle 305 (detection of a primary critical situation) and executes the process 100 described above with respect to FIG. 3. The driver is warned of the detection of a primary critical situation by, for example, an audible warning, a visible warning, a tactile warning, or a combination thereof. The second sensor 20 is protracted above the outer surface of the vehicle 10 and a 360-degree scan is executed. The second sensor 20 detects the first pole 315 and the second pole 320 to the right of the vehicle 10. The second sensor 20 also detects the third vehicle 310 which is traveling in the opposite lane of the road 300.

After the second sensor has executed the 360-degree scan and identified each of the primary and secondary critical situations, the controller 55 determines what, if any, evasive actions to take. In the described embodiment, the controller 55 determines that the vehicle 10 does not have sufficient time to complete a braking maneuver before a collision with the second vehicle 305. The controller 55 determines that an evasive steering maneuver to the right is not safe because of the first pole 315 and the second pole 320. The controller 55 then determines that the third vehicle 310 has sufficiently passed the vehicle 10, and does not detect any other vehicles traveling in the opposite lane. Therefore, the controller 55 determines that the safest maneuver is an evasive left steering maneuver 325. After executing the maneuver 325, the controller 55 again determines whether automatic braking is required or if any further evasive steering maneuvers are required. If the controller 55 determines that each critical situation has been avoided, it relinquishes control of the steering and braking subsystems, and the second sensor 20 is retracted below the outer surface of the vehicle 10.

In situations where the controller 55 initiates an evasive driving maneuver (e.g., braking, steering, or accelerating, etc.), the controller 55 does not assume full control of the vehicle. If an evasive driving maneuver is executed, a driver is able to override, the evasive driving maneuver by manually operating the brakes, accelerator, or steering wheel at any point during the maneuver. In many instances, however, the vehicle 10 is capable of executing the maneuver quickly enough that the vehicle 10 avoids a critical situation before the driver reacts.

Thus, the invention provides, among other things, a system and method for vehicle collision avoidance. Various features and advantages of the invention are set forth in the following claims.

What is claimed is:
1. A collision avoidance system comprising:
a first sensor configured to be coupled to a vehicle at a first location and monitor a first area;
a second sensor configured to be coupled to the vehicle at a second location and to monitor a second area through 360 degrees, where the second location is either on a top portion or a bottom portion of the vehicle;

wherein the second sensor is configured to be movable along and rotatable about a vertical axis with respect to the vehicle; and a controller configured to be coupled to the first and second sensors, detect a primary critical situation using the first sensor, generate a signal to move the second sensor from a first retracted position to a second protracted position only if a primary critical situation is detected, generate a control signal to cause the second sensor to sweep an area surrounding the vehicle through 360 degrees, identify zero or more secondary critical situations, determine if the primary critical situation remains, and initiate an evasive driving maneuver.

2. The system of claim 1, wherein the sweep of the area surrounding the vehicle is a radial sweep.

3. The system of claim 1, wherein the second sensor is protracted from the first retracted position to the second protracted position.

4. The system of claim 1, wherein the second sensor is a light detection and ranging sensor.

5. The system of claim 1, wherein the first area is in front of the vehicle.

6. The system of claim 1, wherein the first area is behind the vehicle.

7. The system of claim 1, wherein the evasive driving maneuver is a braking maneuver.

8. The system of claim 1, wherein the evasive driving maneuver is a steering maneuver.

9. The system of claim 1, wherein the evasive driving maneuver is an acceleration maneuver.

10. The system of claim 1, wherein the second sensor is positioned below an outer surface of the vehicle when in the first retracted position.

11. The system of claim 1, wherein the second sensor is positioned above an outer surface of the vehicle when in the second protracted position.

12. The system of claim 1, wherein the controller is further configured to generate a signal to warn an operator about the primary critical situation.

13. A method of avoiding a vehicle collision, the method comprising:

coupling a controller to a first sensor and a second sensor, the second sensor movable along and rotatable about a vertical axis with respect to the vehicle;

monitoring a first area with the first sensor;

identifying, with the controller, a primary critical situation using the first sensor;

moving, with respect to a vehicle, the second sensor from a first retracted position to a second protracted position only if a primary critical situation is identified;

monitoring a second area through 360 degrees using the second sensor;

identifying, with the controller, zero or more secondary critical situations using the second sensor;

determining if the primary critical situation remains; and initiating an evasive driving maneuver.

14. The method of claim 13, wherein monitoring the second area includes executing a radial sweep of the second area.

15. The method of claim 13, wherein moving the second sensor from the first retracted position to the second protracted position includes protracting the second sensor from the first retracted position to the protracted second position.

16. The method of claim 13, wherein coupling the controller to the second sensor includes coupling the controller to a light detection and ranging sensor.

17. The method of claim 13, wherein monitoring the first area with the first sensor includes monitoring an area in front of the vehicle.

18. The method of claim 13, wherein monitoring the first area with the first sensor includes monitoring an area behind the vehicle.

19. The method of claim 13, wherein initiating the evasive driving maneuver includes initiating a braking maneuver.

20. The method of claim 13, wherein initiating the evasive driving maneuver includes initiating a steering maneuver.

21. The method of claim 13, wherein initiating the evasive driving maneuver includes initiating an acceleration maneuver.

22. The method of claim 13, wherein moving the second sensor from the first retracted position includes moving the second sensor from a position below an outer surface of the vehicle.

23. The method of claim 13, wherein moving the second sensor to the second protracted position includes moving the second sensor to a position above an outer surface of the vehicle.

24. The method of claim 13, further comprising warning an operator about the primary critical situation.

* * * * *